Patented June 2, 1942

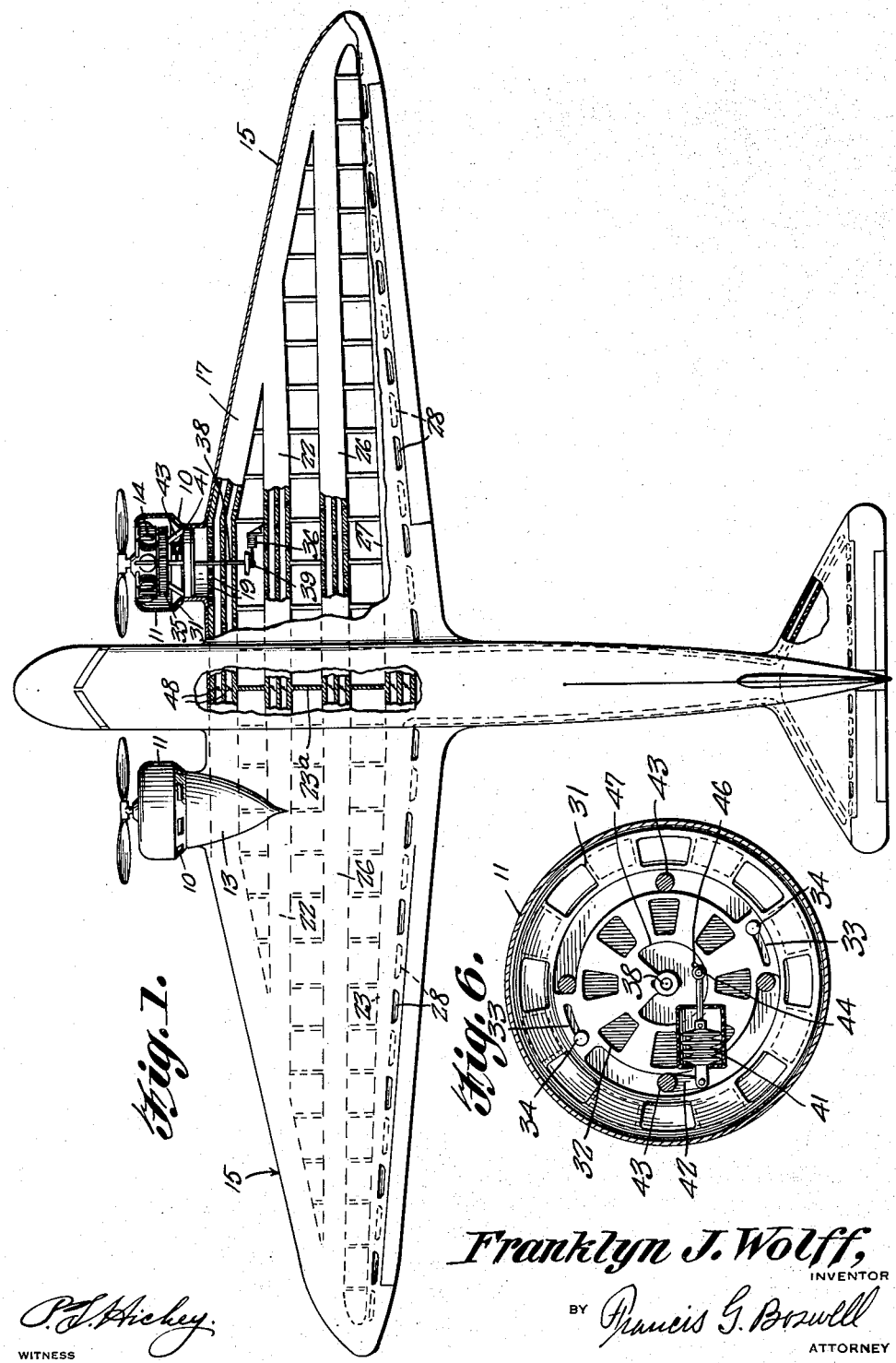

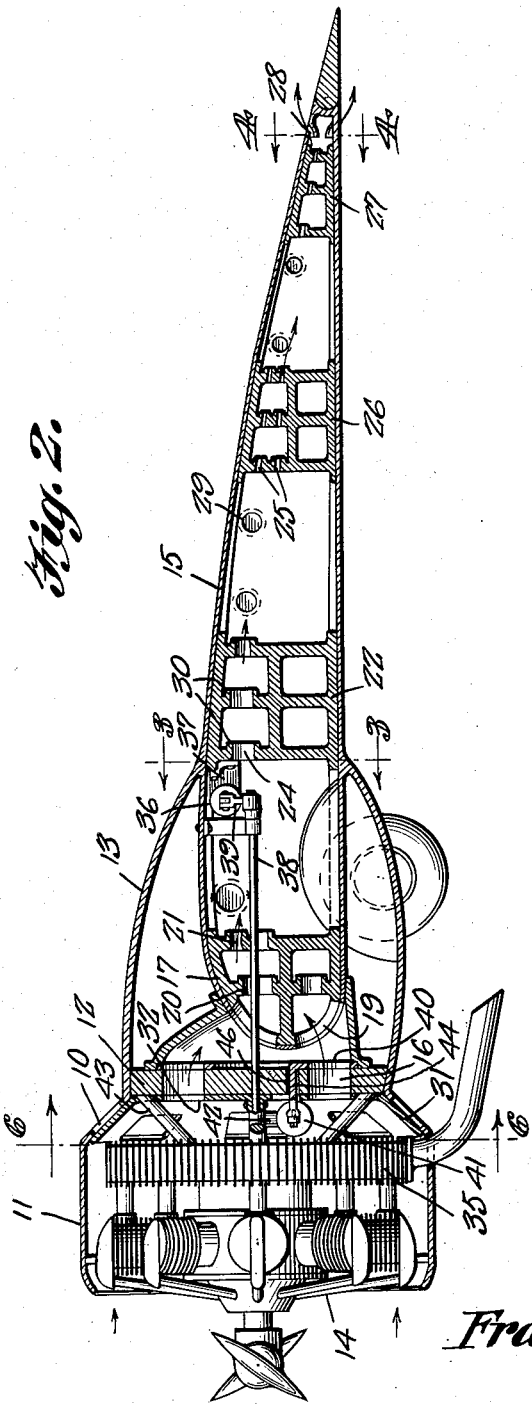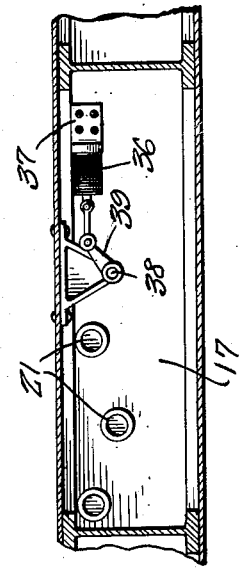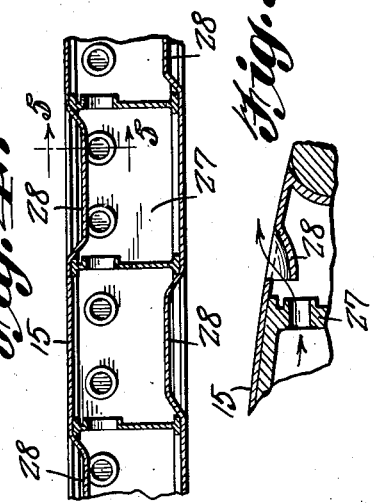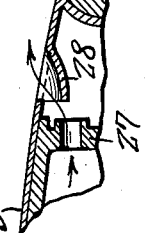

2,285,071

UNITED STATES PATENT OFFICE 2,285,071

AIRPLANE EQUIPPED TO HEAT THE WINGS

Franklyn J. Wolff, Trenton, N. J.

Application April 5, 1940, Serial No. 328,125

8 Claims. (Cl. 244—134)

The object of the invention is to so modify the construction of airplanes that motor heated air may be forced into the wings, displacing cold air therein, and raising the wing temperature, so that the formation of ice on the upper surface of the wings is positively precluded; to provide a construction for the maintenance of wing temperature above the freezing point that will automatically provide for admission of heated air into the wings in such increments only as to maintain the desired temperature, diverting the remaining heated air to the atmosphere to preclude dangerous motor temperatures; to provide an equipment of the kind indicated in which the two wings of the airplane are separately controlled in order that the one wing, where it is exposed to a head wind with its consequent cooling effect may be heated sufficiently to maintain the desired temperature therein without unduly raising the temperature of the companion wing; to provide a construction wherein, in the event of failure of one motor, communication between it and its attendant wing may be automatically cut off and the temperature of both wings maintained by the remaining motor; and generally to provide wing heating equipment which is of comparatively simple form, susceptible of installation without material modification of the airplane, and of a character not likely to fail in service or to subject the motors to undue heating.

With this object in view, the invention consists in a construction and combination of parts of which a preferred embodiment is illustrated in the accompanying drawings but to which the invention is not to be restricted. Practical application may dictate certain changes or alterations and the right is claimed to make any which fall within the spirit of the invention.

In the drawings:

Figure 1 is a plan view of an airplane, partly broken away, the construction of which has been modified to incorporate the invention.

Figure 2 is a vertical sectional view in the plane of the axis of one of the motors.

Figure 3 is a sectional view on the plane indicated by the line 3—3 of Figure 2.

Figure 4 is a sectional view on the plane indicated by the line 4—4 of Figure 2.

Figure 5 is a sectional view on the plane indicated by the line 5—5 of Figure 4.

Figure 6 is a sectional view on the plane indicated by the line 6—6 of Figure 2.

In carrying out the invention, the air which flows over the motors and which in common practice is dissipated through the gills 10 formed in the cowl 11, is directed either into the wings, or through the gills, or partly through the wings and through the gills.

To this end, the back wall 12 disposed in the motor nacelle 13 between the motor 14 and the leading edge of the wing 15 is provided with a circular series of openings 16 which constitute heated air ports and through which the air passing over the motor cylinders may enter the interior of the wing.

The wing structure is modified by employing the spars as heated air headers. The leading spar 17 serves as the forward header and where it defines the rounded forward edge of the wing is punched, as indicated at 19, to provide air admission ports to the forward cells of the spar, the vertical web portions being punched, as indicated at 20 and 21, to provide air admission ports to the different cells of the spar, the last named ports providing air admission ports into the wing space between the leading and intermediate spar 22.

Such air as enters the wing, therefore, enters the cells of the leading spar 17 and traverses the latter, being distributed in the wing space between the ribs 23 and between the leading and intermediate spar 22, the upper cells of which it enters through the ports 24 formed by punching the web portions of the intermediate spar. The ports 24 are confined to the upper side of the intermediate spar 22 and similar ports 25 which are formed in the second intermediate spar 26 are likewise confined to the upper side of the spar. This because the heating effect of the air is desired at the upper side of the wing against the skin covering constituting the top surface of the wing. The heated air is distributed from the cells of the intermediate spar 22 into the space between that spar and the spar 26 and, through the ports 25, is distributed through the space between the spar 26 and the trailing spar 27.

But heated air cannot enter the wing without the contained air being displaced and therefore the wing at the trailing edge has the wing covering slit between the ribs 23 successively on the upper and lower surfaces of the wing and the skin, where the slit is formed, is depressed or forced inward so as to provide air discharge mouths 28 through which the contained cold air in the wing may be discharged as the heated air enters.

The wing space on opposite sides of the ribs 23 is placed in communication through ports 29 consisting of holes punched in the ribs.

The formation of the ports in the spars is accomplished without any sacrifice in the strength of the spars, since enough stock is left in the punching operation to pean it over into the form of flanges 30 encircling the spar ports, thus strengthening the spars by an amount approximating what loss of strength would result in the formation of straight punched unflanged holes.

The gills 10 are either exposed or covered, or partly covered by the movement of the dampers 31 which have a slide mounting in the cowl 11, these dampers being mounted for movement in synchronism with dampers 32 mounted on the front face of the wall 12 and angularly movable to cover or expose the ports or openings 16. The angular movement of the two sets of dampers is limited by the slots 33 through which pass the pins 34 mounted in the front face of the wall 12. The ports 16 and gills 10 are angularly displaced, so that when the dampers 31 close the gills 10, the dampers 32 will be in positions uncovering the ports 16; but when the dampers 32 close the ports 16, the dampers 31 expose the gills 10. Any intermediate positions of the dampers will leave the gills 10 and ports or openings 16 partly closed and partly open. Thus the air which flows over the engine cylinders and over the exhaust manifold 35 and is heated thereby passes either out through the gills 10 or in through the ports or openings 16 to the interior of the wing, or partly out through the gills and partly into the wing, depending on the damper setting.

The exhaust manifold 35 is an annular header with which the exhausts of the cylinders are connected and in order to give it the greatest air heating effect is exteriorly ribbed, as shown.

The dampers 31 and 32 are automatically controlled by a heat responsive device 36 which may be any acceptable form of thermostat but which is shown as a thermostat of the disk type and mounted within the wing as, for example, on the front face of the intermediate spar 22, being carried by a bracket 37. The thermostat is preferably as near the top skin of the wing as practical and it is operatively connected with a shaft 38 extending centrally through an appropriate bearing in the wall 12, on the exterior face of which it is operatively connected with the damper assembly but being anchored to the center of the plate carrying the dampers 32. The operative connection between the thermostat and the shaft consists of an arm 39 exending radially from the latter and to the outer extremity of which the thermostat is connected. When the temperature rises in the wing, the thermostat expands and thereby rocks the shaft, closing the dampers 32 and opening the dampers 31 or holding the damper sets in any intermediate positions sufficient to admit enough heated air into the wing to maintain the desired temperature within the latter.

The means by which cold air is precluded from entering the wing, as in the case of a dead motor when the air flowing over the latter would not be heated, is a damper plate 40 mounted on the inner or back face of the wall 12 and arranged to cover or expose the ports 16, depending on its position. This damper is actuated by a thermostat 41 positioned between the manifold 35 and the wall 12, so as to be responsive to engine heat. Since the air in the region of the manifold will be extremely warm, the thermostat 41 will be so arranged that the air reaching it will be tempered, as by partially insulating the thermostat. The thermostat 41 is rockingly supported on a hanger bar 42 swung from one of the motor supports 43 and its remote end is connected by means of an angular arm 44 with the damper 40, the angular portion of the arm which connects with the damper passing through an arcuate slot 46 in the wall 12 and through a clearance opening 47 in the damper plate 32. Thus the two dampers may move independently but the arrangement is such that when the thermostat 41 is subjected to heat, the damper 40 will be held in its open position, being closed only when the thermostat 41 contracts, as it will in the presence of cold air, as when the motor stops.

The ribs between the two intermediate spars and between the more rearward of these two and the trailing spar will preferably be provided with the perforations 29 but such perforations will be omitted from the ribs between the leading spar and the first intermediate spar. Since the former acts as the main air header, this arrangement will make for more even distribution of the heated air at the forward edge of the wing, the perforations 29 acting as heat equalization means from the center of the wing to the rear. The perforations, however, will be omitted from the center rib 23a, so that communication between the two wings can be controlled by means of butterfly valves 48 which are designed to be operated in synchronism and which close at the center the ducts which the wing spars provide. Normally the butterfly valves will be in a position of closure so that each wing will be heated with its attendant motor, each wing being provided with both of the thermostatic controls.

A wing temperature of 36° or thereabout will be sufficient to prevent the formation of ice, in which case the thermostats 36 will maintain the dampers 32 closed and the gill dampers 31 open. Thus the air which passes over the engine cylinders will be dissipated through the gills as is the present practice. But let the temperature within the wings drop. The thermostats 36 contract and advance the gill dampers 31 toward closed position and the wall dampers 32 toward open position. If the wing temperature is low enough, the gill dampers will be closed and the wall dampers opened, so that all of the air passing over the engine cylinders and over the engine manifold will be directed into the wings, driving out the cold air therein through the discharge mouths 28 and, as the admitted air is cooled within the wing and replaced by other warm air, it will pass out through the discharge mouths 28. The air being discharged from the wings will thus be of sufficient temperature to prevent the formation of ice at the pivoted edges of the ailerons 49. If the surrounding temperature is high enough for the wing temperature to be maintained without its air being displaced with warm air, the thermostats will expand, close the wall dampers and open the gill dampers, so that the heated air will then pass out through the gills. Thus, the thermostats act as means to provide for displacing the air within the wing with heated air in sufficient amounts to maintain a predetermined temperature within the wings.

But suppose the ship be moving in a head wind when it is necessary to swing it angularly in order to effect an advance. Then the one wing is leading and the other trailing. But the thermostat of the leading wing will take care of the conditions surrounding it, as will the thermostat of the trailing wing.

If one motor fails, the result will not be the admission of cold air into the attendant wing for then the thermostat 41 of that motor will function. When the motor was operating, the heat so affected the thermostat that the damper 40 was maintained in open position, but upon motor failure, the drop in temperature which followed contracted the rheostat and resulted in closing the damper 40, so that cold air was precluded from entering the wing. But in such a contingency, the butterfly valves 48 would be operated to place the two wings in communication, when the active motor would function to maintain the proper temperature of both just as it did when serving the single wing.

The butterfly valves 48 are manually actuated.

The invention having been described, what is claimed as new and useful is:

1. The combination with an airplane having a hollow wing, a motor nacelle mounted on the wing, a motor carried in the motor nacelle and a cowl around the motor and provided at the rear thereof with gills, of a wall mounted in the nacelle in rear of the motor and provided with ports, dampers movable into and out of positions of closure for said gills, other dampers synchronized with the first dampers and movable into and out of positions of closure for said ports, the gill dampers being open when the port dampers are closed, and means operatively connected with said dampers for actuation of the same, the interior wing space being in communication with said ported wall.

2. The combination with an airplane having a hollow wing, a motor nacelle mounted on the wing, a motor carried in the motor nacelle and a cowl around the motor and provided at the rear thereof with gills, of a wall mounted in the nacelle in rear of the motor and provided with ports, dampers movable into and out of positions of closure for said gills, other dampers synchronized with the first dampers and movable into and out of positions of closure for said ports, the gill dampers being open when the port dampers are closed, and means operatively connected with said dampers for the actuation of the same, the wing at the trailing edge being formed with a series of air discharge mouths and at its leading edge having its interior in communication with said ported wall.

3. The combination with an airplane having a hollow wing, a motor nacelle mounted on the wing, a motor carried in the motor nacelle and a cowl around the motor and provided at the rear thereof with gills, of a wall mounted in the nacelle in rear of the motor and provided with ports, dampers movable into and out of positions of closure for said gills, other dampers synchronized with the first dampers and movable into and out of positions of closure for said ports, the gill dampers being open when the port dampers are closed, and a thermostat within the wing and operatively connected with said dampers for the actuation of the same, the interior wing space being in communication with said ported wall.

4. The combination with an airplane having a hollow wing, a motor nacelle mounted on the wing, a motor carried in the motor nacelle and a cowl around the motor and provided at the rear thereof with gills, of a wall mounted in the nacelle in rear of the motor and provided with ports, dampers movable into and out of positions of closure for said gills, other dampers synchronized with the first dampers and movable into and out of positions of closure for said ports, the gill dampers being open when the port dampers are closed, and a thermostat within the wing and operatively connected with said dampers for the actuation of the same, the wing at the trailing edge being formed with a series of air discharge mouths and at its leading edge having its interior in communication with said ported wall.

5. The combination with an airplane having a hollow wing, a motor nacelle mounted on the wing, a motor carried in the motor nacelle and a cowl around the motor and provided at the rear thereof with gills, of a wall mounted in the nacelle in rear of the motor and provided with ports, dampers movable into and out of positions of closure for said gills, other dampers synchronized with the first dampers and movable into and out of positions of closure for said ports, the gill dampers being open when the port dampers are closed, and a thermostat within the wing and operatively connected with said dampers for the actuation of the same, the wing at the trailing edge being formed with a series of air discharge mouths and at its leading edge having its interior in communication with said ported wall, said air discharge mouths being successively at the top and bottom surfaces of the wing.

6. The combination with an airplane having a hollow wing, a motor nacelle mounted on the wing, a motor carried in the motor nacelle and a cowl around the motor and provided at the rear thereof with gills, of a wall mounted in the nacelle in rear of the motor and provided with ports, dampers movable into and out of positions of closure for said gills, other dampers synchronized with the first dampers and movable into and out of positions of closure for said ports, the gill dampers being open when the port dampers are closed, a thermostat within the wing and operatively connected with said dampers for the actuation of the same, a further damper controlling the ports in said wall, and a thermostat actuating the last said damper and responsive to engine heated air to maintain said damper open when expanded and closed when contracted.

7. The combination with an airplane having a hollow wing, a motor nacelle mounted on the wing, a motor carried in the motor nacelle and a cowl around the motor and provided at the rear thereof with gills, of a wall mounted in the nacelle in rear of the motor and provided with ports, dampers movable into and out of positions of closure for said gills, other dampers synchronized with the first dampers and movable into and out of positions of closure for said ports, the gill dampers being open when the port dampers are closed, and a thermostat within the wing and operatively connected with said dampers for the actuation of the same, the spars being punched to provide air ports so that the cells thereof may act as headers for the distribution of heated air in the wings.

8. The combination with an airplane having hollow wings, a motor nacelle mounted on each wing, a motor carried in each motor nacelle and a cowl around each motor and provided at the rear thereof with gills, of a wall mounted in each nacelle in rear of the motor and provided with ports, dampers movable into and out of positions of closure for said gills, other dampers synchronized with the first dampers and movable into and out of positions for said ports, the gill dampers being open when the port dampers are closed, a thermostat within each wing and operatively connected with the dampers of that wing for the actuation of the same, further dampers controlling the ports in said wall, a thermostat actuating the last said dampers and responsive to the motor contacted air of the attendant motor, each wing being in communication at its leading edge with its associated ported wall and having air discharge mouths at its trailing edge, and manually actuable valves controlling communication between the wings.

FRANKLYN J. WOLFF.